United States Patent

[11] 3,633,304

[72] Inventor Virgil T. Brazell
    Albuquerque, N. Mex.
[21] Appl. No. 37,697
[22] Filed May 15, 1970
[45] Patented Jan. 11, 1972
[73] Assignee Silas E. McAfee
    Albuquerque, N. Mex.
    a part interest

[54] FISHING ROD HOLDER AND ALARM
    2 Claims, 3 Drawing Figs.
[52] U.S. Cl. .................................................. 43/17
[51] Int. Cl. ............................................ A01k 97/12
[50] Field of Search.......................................... 43/17

[56] References Cited
    UNITED STATES PATENTS
3,020,664  2/1962  Snyder et al. ................. 43/17
3,058,251  10/1962 Brooks ......................... 43/17
3,283,437  11/1966 Galarneau ..................... 43/17
3,285,360  11/1966 Wetsch......................... 43/17

Primary Examiner—Samuel Koren
Assistant Examiner—Daniel J. Leach
Attorney—Strauch, Nolan, Neale, Nies & Kurz ABSTRACT: A fishing rod holder and alarm including a support post carrying a signal and battery support housing. The housing has a dependent, laterally swingable rod support and signal actuator arm disposed at one side thereof to lie along the side of the support post remote from the water for actuation by a pull on the line substantially at right angles to the rod. The pull on the line moves the arm toward the support post to minimize the likelihood of a disassociation of the rod from the holder.

INVENTOR
VIRGIL T. BRAZELL

BY *Strauch, Nolan, Neale, Nies & Kurz*
ATTORNEYS

FISHING ROD HOLDER AND ALARM

BACKGROUND OF THE INVENTION

The present invention relates to fishing rod holders and alarm devices of the type generally utilized in still fishing and ice fishing to relieve the user of the strain of holding the rod ready for a strike for long periods of time. While generally used in the aforesaid types of fishing in which a support post is driven into the earth or ice adjacent the water to be fished, the rod holder and alarm may also be used in fishing from a boat by mounting a suitable support post socket along the upper sides or stern of a boat for supporting the rod during lulls in still fishing or trolling. While various forms of rod holders and alarms have been heretofore proposed and used, as will appear from an inspection of U.S. Letters Pat. Nos. 2,816,388 to C. C. Hartley, 2,996,824 to J. A. Faycosh, 3,020,664 to E. D. Snyder et al., 3,058,251 to H. G. Brooks, 3,156,997 to W. H. Smith, 3,228,135 to J. Kricksfeld et al. and 3,285,360 to C. A. Wetsch, these devices uniformly embody quick release rod holder and signal actuator arms which are designed to loosely support the rod adjacent the tip for signal actuation solely upon the downward force exerted on the rod as a result of tightening of the line upon a strike, provide relatively complicated and expensive signal-operating mechanism, and, in case of a tardy retrieval of the rod after the strike signal is given and the hooked fish begins an erratic run, set up undulations of the rod relative to the rod holder and support post that often result in a dislodgement of the rod from the shallow bite of the rod support hook. As a consequence of such dislodgement, the rod retrieval is rendered difficult and in cases where the reel is locked or the reel brake is set too tight, the running fish will, after dislodgement of the rod and alignment of the line in a direct line with the direction of the running course of the fish, actually drag the rod and reel into the water with resultant loss of the rod, line and tackle. The present invention overcomes these deficiencies of the prior art by providing a rod holder and alarm of utmost simplicity in which the rod holder and actuating arm are arranged to receive the rod near its tip and operate upon a sidewise pull on the rod tip by a line extending substantially at right angles to the length of the rod and past the post. As a consequence of this arrangement, the striking and running force of the hooked fish acts to first shift the rod holder toward the post to actuate the signal and thereafter is transmitted through the contacting rod holder and its support housing directly to the support post thereby minimizing the undulating movement of the rod and preventing its dislodgement from the holder.

SUMMARY OF THE INVENTION

A primary object of the present invention resides in providing a fishing rod support and alarm device including a support post and rod support and alarm mechanism with a pendant pivoted rod holder and contact arm disposed to move toward the support post in response to a strike.

A further object of the present invention resides in providing a fishing rod support and alarm device including a support post and rod support and alarm device having a pendant pivoted rod holder and contact arm arranged to support the tip of a fishing rod disposed in use substantially at right angles to the cast line with the support post anteriorily positioned relative to the rod tip and rod holder and contact arm in the direction of the extended cast line in response to a strike after the rod holder and contact arm makes contact to energize the alarm.

BRIEF DESCRIPTION OF THE DRAWINGS

Further objects of the invention will appear from the following description and appended claims when read in conjunction with the attached drawings wherein:

DESCRIPTION OF THE PREFERRED EMBODIMENT

Figure 3:
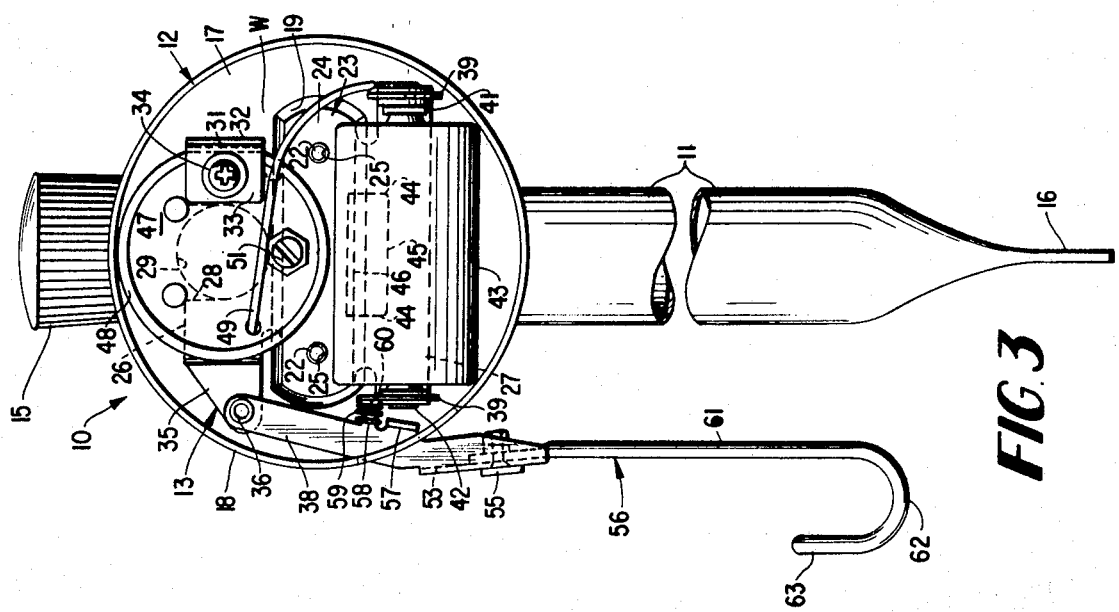
FIG. 3 is a front-elevational view of the fishing rod holder and alarm device of the present invention with the alarm device cover removed to illustrate the details of the alarm device and its combined ground contact arm and rod holder.
Figure 2:
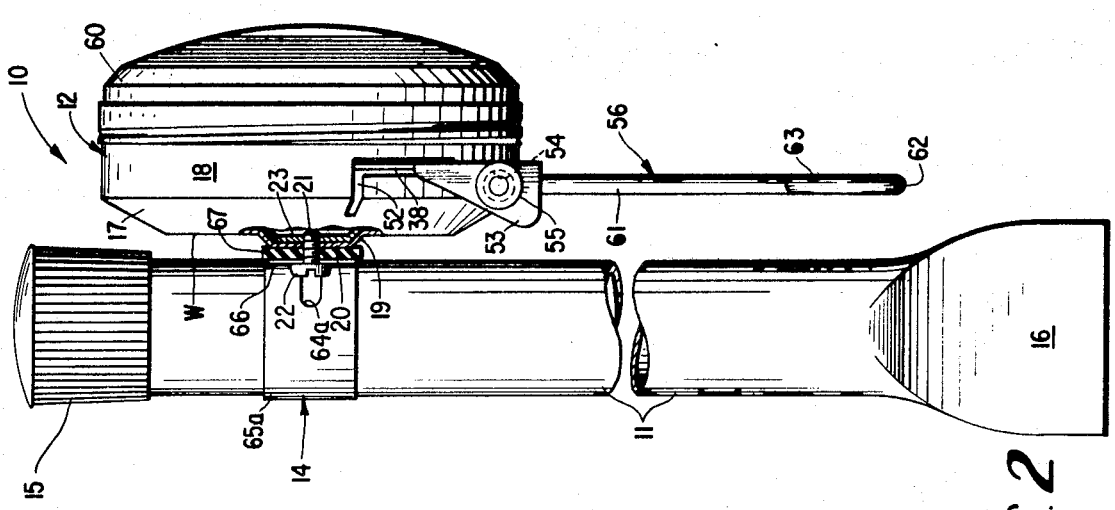
FIG. 2 is a side-elevational view of a preferred form of fishing rod holder and alarm device embodying the present invention.

With continued reference to the drawings wherein the same reference numerals are employed throughout to indicate the same parts, numeral 10 designates generally the fishing rod holder and alarm device of the present invention. Referring for the moment to FIGS. 2 and 3, the fishing rod holder and alarm device 10 is composed of a support post 11 illustrated as a length of cylindrical metal tubing, an alarm mechanism housing 12 of generally cup-shaped configuration for housing the alarm mechanism designated 13 (FIG. 3), an attachment strap 14 (FIG. 2) for fixedly mounting housing 12 to the upper end of post 11, and an axially ribbed plastic cap 15 frictionally secured to the upper end of post 11. The lower end of post 11 is swaged to form a flattened blade end 16 adapting post 11 for easy entrance into the earth or a mating socket member (not shown) where the rod holder and alarm device 10 is to be used on a boat.

Cup-shaped housing 12 comprises a generally planar backwall W merging into a forwardly and outwardly inclined section 17 and annular sidewall 18 and provided with the laterally directed, vertically centered rectangular depression 19 defining a planar horizontally directed abutment wall section 20 (FIG. 2). Wall section 20 at equidistantly laterally spaced points is provided with a pair of respective through passages 21 (FIG. 2) dimensioned to freely pass the shanks of headed securing screws 22 provided to secure an alarm mechanism mounting bracket 23 in depression 19 and to draw attachment strap 14 tightly around post 11 to fix housing 12 to post 11.

Bracket 23 as best seen in FIG. 3, comprises an attachment base 24 of generally rectangular configuration provided with laterally spaced tapped openings 25 for threaded cooperation with screws 22 and integrally formed upper and lower forwardly offset platelike mounting sections 26 and 27. Upper mounting section 26 comprises a main body section of generally rectangular configuration provided with a through slot 28 along one edge having a semicircular closed end registering with a circular through opening 29 formed in housing backwall W to increase the range of the sound produced by the alarm mechanism to be presently described. At its right end, mounting section 26 is provided with an upstanding leg 31 (FIG. 3) integrally joined to section 26 at its lower end through an inwardly opening channel section 32 and provided at its upper end with a right-angularly inwardly directed overhanging arm portion 33 through apertured to freely pass the shank of a securing screw 34 the purpose of which will presently appear. At its opposite end, mounting section 26 is formed with an integral upwardly offset, laterally directed mounting ear 35 formed with a through apertured journal opening mounting a pivot 36 in the form of a loose-fitting hollow rivet, the upper end of which is deformed by a suitable spinning operation to overlie and journal a pendant ground contact arm 38 to ear 35.

Lower mounting section 27 comprises a main body section of generally rectangular configuration provided at its opposite ends with respective upstanding legs 39 through apertured adjacent their upper ends to receive respective insulated contacts 41 and 42 disposed in laterally opposed alignment. Contact 41 is in the form of a spring metal strip bent downwardly into an inverted U-shape and serves as a resilient contact to engage the center positive contact of a conventional "C" battery 43 while contact 42 is a button-type contact to engage the bottom of "C" battery 43. The midportion of mounting section 27 adjacent attachment base 24 is cut through along lines 44 and 45 to delimit a tab section which is bent upwardly to form an abutment 46 adapted to engage the insulated casing of "C" battery 43 and force the battery toward the annular wall 18 of housing 12 as it is inserted between contacts 41 and 42.

A cylindrical alarm unit 47 of the buzzer or horn type having a metal casing serving as a ground and formed at its lower end with an annular lip 48 is fitted into position on mounting section 26 with a portion of annular lip 48 seated in channel section 32 of mounting section 26, the diametrically opposite portion of lip 48 abutting the opposing upstanding portion of the upwardly offset mounting ear 35, and its bottom wall abutting the under face of the overhanging arm portion 33 of leg 31. The bottom wall of alarm unit 47 opposite the through aperture in arm portion 33 is drilled and tapped to threadly receive screw 34 which secures alarm unit 47 in place. The power lead 49 of alarm unit 47 is electrically connected to contact 41 in any suitable manner, for example, by a soldered connection. An adjustment screw and locknut assembly 51 is provided in the bottom wall of alarm unit 47 to adjust the sound output of the alarm.

As best seen in FIG. 3, pendant ground contact arm 38 angles downwardly and outwardly from pivot 36 past ground contact 42 and through an inverted L-shaped opening 52 in sidewall 18 and inclined backwall section 17 of housing 12 and is formed at its inwardly bent free end with a generally triangular shaped, downturned, flange 53 through apertured at 54 to receive a headed hollow rivet 55 provided to secure a rod holder extension 56 thereto. Directly opposite contact 42, pendant ground contact arm 38 is provided with an integral upturned tab piece 57 disposed to engage contact 42 upon counterclockwise rotation of arm 38 around pivot 36. Arm 38 adjacent the lower end of tab piece 57 is formed with a flat outward tapering protuberance 58 interfitted in one end of a coil biasing spring 59, the opposite end of which cooperates with a cylindrical spring tab 60 struck out of the metal of leg 39 of bracket 23. Biasing spring 59 normally biases arm 38 to its inoperative position determined by engagement of the outer edge of arm 38 with the upper end of housing opening 52. The housing 12 is completed by closing the open end with a mating cup-shaped cover 60 (FIG. 2) threaded onto the free end of housing wall 18 which is provided in any suitable manner with external threads adjacent its open end.

Since ground contact arm 38 moves in an arcuate path defining a plane of movement generally parallel to the plane of housing backwall W and at right angles to the axis of pivot 36, the present invention utilizes this feature to establish a unique advantage, namely the provision of a fishing rod holder and alarm device which in use will minimize the likelihood of a strike disassociating the rod from rod holder extension 56 and possible loss of the rod and tackle where the reel brake may be set too tight or the brake may be rendered ineffective as a result of dislodgement of the rod through entanglement of the line with the reel, rod guides or the like.

Figure 1:
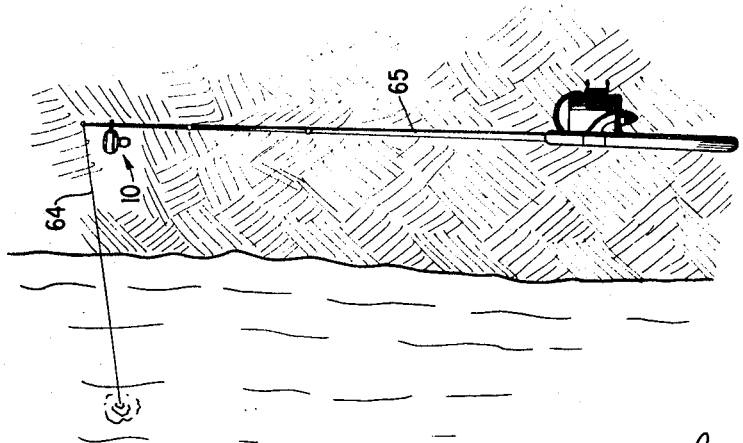
FIG. 1 illustrates the fishing rod support and alarm device of the present invention in use for fishing from the shore of a lake, river, or stream.

To this end, rod holder extension 56 is formed with a long main leg 61 fixed at one end to flange 53 of arm 38 as heretofore described and merging at the other end through an upwardly opening loop 62 into a short leg 63, all lying in a common plane paralleling the path of movement of arm 38 and housing backwall W and at right angles to the axis of pivot 36. By arranging rod holder extension 56 in this way and securing alarm mechanism housing 12 to post 11 as will now be described, arm 38 and rod holder extension 56 will normally lie at one side of post 11 as seen in FIG. 3 for swinging movement toward post 11 in a plane passing post 11 as will be clear from an inspection of FIG. 2. As a consequence, proper operation of ground contact arm 38 requires that post 11 be mounted so as to position housing backwall W generally parallel to the plane defined by the cast line 64 (See FIG. 1) with post 11 in the dihedral angle defined by line 64 and fishing rod 65 positioned at right angles to line 64 to assure a force component, in event of a strike, acting on the rod tip to shift the rod against rod holder leg 61 and toward post 11.

Since this actuating force component acts to first swing arm 38 into contact with ground contact 42 closing the alarm circuit, and thereafter is applied to the upper end of post 11 in a direction to pull the upper end of post 11 toward the hooked fish, the present invention contemplates mounting alarm mechanism housing 12 on post 11 with planar backwall W at right angles to the wide faces of blade end 16 which are disposed at right angles to line 64 to assure a maximum resistance to upsetting of post 11. This is accomplished by the provision of metal strap 14 which is formed with a loop 65a midway of its length and oppositely directed attachment ears 66 slotted as shown at 64a into the merging portion of loop 65a to freely pass the shanks of securing screws 22 threaded into attachment base 24 of bracket 23 to tighten loop 65a around post 11. Preferably a resilient pad 67 dimensioned to overlie abutment wall section 20 of housing 12 is interposed between ears 66 and wall section 20 so that pad 67 will grippingly engage the opposing surface of post 11 to resist angular movement of housing 12 around post 11.

From the foregoing description of the manner of securing housing 12 to post 11, it will be appreciated that the present invention provides a fishing rod holder and alarm device 10 which in use minimizes the possibility (1) of rod 65 becoming disassociated from rod holder extension 56 and (2) of post 11 being upset by a strike during the interval between sounding of the alarm and retrieval of the rod.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A fishing rod holder and alarm for supporting a fishing rod during use substantially at right angles to the direction of the cast line comprising a support post having an end formed to enter the ground or other mounting for said post and an upstanding portion for mounting an alarm device and rod holder; and an alarm device and rod holder fixed to said support post and comprising a housing have a sidewall and a backwall; means including an alarm mechanism and a conventional dry cell battery mounted on said backwall interiorly of said housing in vertically spaced relation, the battery being lowermost with its axis parallel to the backwall and having ground and positive contacts at its opposite ends with its positive contact electrically connected to said alarm mechanism; a ground contact arm journaled in said housing at one side thereof in vertically spaced relation to the ground contact end of said battery for pendant movement toward and away from the ground contact of said battery and extending downwardly through a slot in said housing sidewall and terminating in a hook-shaped rod holder the arms of which are disposed along one side of said support post in the plane of movement of said ground contact arm; biasing means normally biasing said ground contact arm away from the ground contact of said battery, said support post and housing being supported in use with said housing backwall generally paralleling the cast line and said post disposed anteriorily of said hook-shaped rod holder thereby conditioning said alarm mechanism for operation in response to a crosswise force component applied to the rod tip by the line in event of a strike.

2. The fishing holder and alarm of claim 1 wherein said formed post end is wedge-shaped and means is provided to fixedly mount said alarm device and rod holder on said support post with its backwall at right angles to the wide faces of said formed wedge end thereby assuring, when said post is driven into the ground or otherwise supported, a maximum resistance to being upset by the force components applied through the rod holder to the upstanding portion of the support post

* * * * *